United States Patent
Wang et al.

(10) Patent No.: US 9,868,460 B2
(45) Date of Patent: Jan. 16, 2018

(54) DISABLING CONTROLLED VELOCITY RETURN BASED ON TORQUE GRADIENT AND DESIRED VELOCITY ERROR

(71) Applicant: Steering Solutions IP Holding Corporation, Saginaw, MI (US)

(72) Inventors: Chang Wang, Saginaw, MI (US); Anthony J. Champagne, Saginaw, MI (US); Michael K. Hales, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/091,281

(22) Filed: Apr. 5, 2016

(65) Prior Publication Data

US 2017/0066472 A1    Mar. 9, 2017

Related U.S. Application Data

(63) Continuation-in-part of application No. 14/933,461, filed on Nov. 5, 2015.

(60) Provisional application No. 62/213,919, filed on Sep. 3, 2015.

(51) Int. Cl.
*B62D 5/04* (2006.01)
*B62D 6/10* (2006.01)

(52) U.S. Cl.
CPC ......... *B62D 5/0463* (2013.01); *B62D 5/0466* (2013.01); *B62D 6/10* (2013.01)

(58) Field of Classification Search
CPC ....... B62D 5/0463; B62D 5/0466; B62D 6/10
See application file for complete search history.

(56) References Cited

U.S. PATENT DOCUMENTS

| | | |
|---|---|---|
| 4,660,671 A | 4/1987 | Behr et al. |
| 4,800,974 A | 1/1989 | Want et al. |
| 4,874,053 A | 10/1989 | Kimura et al. |
| 5,029,466 A | 7/1991 | Nishihara et al. |
| 5,473,539 A | 12/1995 | Shimizu et al. |
| 5,482,129 A | 1/1996 | Shimizu |
| 5,709,281 A | 1/1998 | Sherwin et al. |
| 5,919,241 A | 7/1999 | Bolourchi et al. |
| 5,927,421 A | 7/1999 | Fukada |
| 5,948,030 A | 9/1999 | Miller et al. |

(Continued)

FOREIGN PATENT DOCUMENTS

| | | |
|---|---|---|
| CN | 100999223 A | 7/2007 |
| CN | 101142548 A | 3/2008 |

(Continued)

OTHER PUBLICATIONS

Ansgar Rehm, Vehicle Velocity Estimation by Dynamic Inversion of Wheel Force Generation; Control Conference (ECC), 2009 European Year: 2009; pp. 4798-4803.

(Continued)

*Primary Examiner* — Richard Camby
(74) *Attorney, Agent, or Firm* — Cantor Colburn LLP

(57) ABSTRACT

A power steering system includes a gain module that generates an estimated driver torque, and a blending module for determining a blend value. The blend value is based at least in part on a derivative of the estimated driver torque, and the blend value is applied to a return torque of a handwheel.

15 Claims, 11 Drawing Sheets

(56) References Cited

U.S. PATENT DOCUMENTS

| | | |
|---|---|---|
| 5,992,557 A | 11/1999 | Nakamura et al. |
| 6,032,091 A | 2/2000 | Noro et al. |
| 6,223,852 B1 | 5/2001 | Mukai et al. |
| 6,250,419 B1 | 6/2001 | Chabaan et al. |
| 6,298,941 B1 | 10/2001 | Spadafora |
| 6,370,459 B1 | 4/2002 | Phillips |
| 6,425,454 B1 | 7/2002 | Chabaan et al. |
| 6,588,541 B2 | 7/2003 | Norman et al. |
| 6,687,590 B2 | 2/2004 | Kifuku et al. |
| 6,742,620 B2 | 6/2004 | Eidam et al. |
| 6,959,970 B2 | 11/2005 | Tseng |
| 7,040,450 B2 | 5/2006 | Nagase et al. |
| 7,558,661 B2 | 7/2009 | Sundaram et al. |
| 7,596,441 B2 | 9/2009 | Yokota et al. |
| 7,885,750 B2 | 2/2011 | Lu |
| 7,954,593 B2 | 6/2011 | Dornhege et al. |
| 7,974,754 B2 | 7/2011 | Nakatsu |
| 7,975,801 B2 | 7/2011 | Tashiro |
| 8,010,252 B2 | 8/2011 | Getman et al. |
| 8,108,105 B2 | 1/2012 | Saruwatari et al. |
| 8,165,770 B2 | 4/2012 | Getman et al. |
| 8,175,771 B2 | 5/2012 | Ukai et al. |
| 8,219,283 B2 | 7/2012 | Recker et al. |
| 8,548,667 B2 | 10/2013 | Kaufmann et al. |
| 8,571,759 B2 | 10/2013 | Oblizajek et al. |
| 8,666,605 B2 | 3/2014 | Delarche et al. |
| 8,666,607 B2 | 3/2014 | Kojo |
| 8,798,864 B2 | 8/2014 | Champagne et al. |
| 8,825,301 B2 | 9/2014 | Sugawara et al. |
| 8,843,276 B2 | 9/2014 | Kojo et al. |
| 8,903,606 B2 | 12/2014 | Kleinau et al. |
| 8,977,433 B2 | 3/2015 | Kojima |
| 8,977,437 B2 | 3/2015 | Tamaizumi et al. |
| 9,327,761 B2 | 5/2016 | Tsubaki |
| 9,387,875 B2 | 7/2016 | Shimizu et al. |
| 9,409,595 B2 | 8/2016 | Varunjikar et al. |
| 9,540,040 B2* | 1/2017 | Varunjikar ......... B62D 5/0472 |
| 9,540,044 B2* | 1/2017 | Kaufmann ......... B62D 5/0463 |
| 9,545,945 B2 | 1/2017 | Akatsuka et al. |
| 2002/0026267 A1 | 2/2002 | Kifuku |
| 2002/0092696 A1 | 7/2002 | Bohner et al. |
| 2002/0177932 A1 | 11/2002 | Kifuku et al. |
| 2002/0179362 A1 | 12/2002 | Norman et al. |
| 2003/0074120 A1 | 4/2003 | Kleinau |
| 2004/0024505 A1 | 2/2004 | Salib et al. |
| 2004/0055810 A1 | 3/2004 | Chabaan |
| 2004/0099469 A1 | 5/2004 | Koibuchi et al. |
| 2004/0117088 A1 | 6/2004 | Dilger |
| 2004/0262063 A1 | 12/2004 | Kaufmann et al. |
| 2005/0189163 A1 | 9/2005 | Barton et al. |
| 2005/0206224 A1 | 9/2005 | Lu |
| 2005/0206229 A1 | 9/2005 | Lu et al. |
| 2005/0246085 A1 | 11/2005 | Salib et al. |
| 2005/0256620 A1 | 11/2005 | Kato |
| 2007/0299580 A1 | 12/2007 | Lin |
| 2008/0147276 A1 | 6/2008 | Pattok et al. |
| 2009/0024281 A1 | 1/2009 | Hwang |
| 2009/0105907 A1 | 4/2009 | Yamaguchi et al. |
| 2009/0125186 A1 | 5/2009 | Recker et al. |
| 2009/0143938 A1 | 6/2009 | Nishimura |
| 2009/0216407 A1 | 8/2009 | Cottard et al. |
| 2009/0292421 A1 | 11/2009 | Williams et al. |
| 2009/0294206 A1 | 12/2009 | Oblizajek et al. |
| 2010/0100283 A1 | 4/2010 | Hales et al. |
| 2010/0286869 A1 | 11/2010 | Katch et al. |
| 2011/0022272 A1 | 1/2011 | Hung et al. |
| 2011/0218706 A1 | 9/2011 | Mori et al. |
| 2012/0041644 A1 | 2/2012 | Turner |
| 2012/0199414 A1 | 8/2012 | Shimizu et al. |
| 2012/0261209 A1 | 10/2012 | Shiino |
| 2012/0312627 A1 | 12/2012 | Morishita et al. |
| 2013/0024072 A1 | 1/2013 | Michelis et al. |
| 2013/0030654 A1 | 1/2013 | Oblizajek et al. |
| 2013/0073146 A1 | 3/2013 | Konomi et al. |
| 2013/0131926 A1 | 5/2013 | Champagne et al. |
| 2013/0151066 A1 | 6/2013 | Koukes et al. |
| 2013/0261894 A1 | 10/2013 | Kojima |
| 2014/0005894 A1 | 1/2014 | Aoki |
| 2014/0257641 A1 | 9/2014 | Champagne et al. |
| 2014/0324294 A1 | 10/2014 | Champagne |
| 2015/0191200 A1 | 7/2015 | Tsubaki et al. |
| 2016/0075371 A1 | 3/2016 | Varunjikar et al. |
| 2016/0288825 A1 | 10/2016 | Varunjikat et al. |

FOREIGN PATENT DOCUMENTS

| | | |
|---|---|---|
| CN | 101434258 | 5/2009 |
| CN | 101522504 A | 9/2009 |
| CN | 101734277 A | 6/2010 |
| CN | 102556065 A | 7/2012 |
| CN | 102806942 A | 12/2012 |
| CN | 102917939 A | 2/2013 |
| CN | 103079934 | 5/2013 |
| CN | 102556152 B | 7/2013 |
| DE | 19634728 C1 | 4/1998 |
| DE | 19824914 | 12/1999 |
| DE | 10344279 A1 | 4/2004 |
| DE | 102008051552 A1 | 4/2009 |
| DE | 102008036001 A1 | 2/2010 |
| EP | 0353995 A2 | 2/1990 |
| EP | 1508495 A2 | 2/2005 |
| EP | 1623907 A1 | 2/2006 |
| EP | 1995150 A2 | 11/2008 |
| EP | 2028080 A1 | 2/2009 |
| EP | 1808359 B1 | 4/2009 |
| EP | 2184218 A2 | 5/2010 |
| EP | 2275323 A1 | 1/2011 |
| EP | 2223838 B1 | 11/2011 |
| EP | 2492168 A1 | 8/2012 |
| EP | 2497698 A1 | 9/2012 |
| GB | 2454788 A | 5/2009 |
| JP | 2001106099 A | 4/2001 |
| JP | 2003002222 A | 1/2003 |
| JP | 3712876 B2 | 11/2005 |
| JP | 2006143151 A | 6/2006 |
| JP | 3819261 B2 | 9/2006 |
| JP | 2006248250 A | 9/2006 |
| JP | 2007514602 A | 6/2007 |
| JP | 2009006985 A | 1/2009 |
| JP | 2009051292 A | 3/2009 |
| JP | 2011051409 A | 3/2011 |
| KR | 2006083578 A | 7/2006 |
| WO | 2005097577 A1 | 10/2005 |
| WO | 2011148240 A1 | 12/2011 |
| WO | 2012066704 A1 | 5/2012 |
| WO | 2012176553 A1 | 12/2012 |

OTHER PUBLICATIONS

China Patent Application No. 201210586416.7 3rd Office Action dated Feb. 15, 2016 (NXT0014CN), 14 pages.

Chinese Office Action for related Chinese Application No. CN201410086920.X, dated May 23, 2016, 8 pages.

D.I. Katzourakis, et al.; "Steering Force Feedback for Human-Machine-Interface Automotive Experiments"; IEEE Transactions on Instrumentation and Measurement, vol. 60, No. 1, pp. 32-43, Jan. 2011.

English Translation of Chinese Office Action for related CN Application No. 20121058416.7; dated Dec. 3, 2014; 15 pages.

English Translation of Chinese Office Action for related CN Application No. 201210586416.7; dated Aug. 12, 2015; 14 pages.

English Translation of CN Chinese Office Action for related Chinese Application No. CN201410086920.X, dated May 23, 2016, 17 pages.

English Translation of CN Office Action & Search Report for related CN Application No. 201410086920.X; dated Nov. 5, 2015; 10 pages.

English Translation of CN Office Action & Search Report for related CN Application No. 2014110331120.X; dated Nov. 30, 2015; 9 pages.

EP Search Report for related EP Application No. 14166178.5; dated Aug. 22, 2014; 7 pages.

(56) References Cited

OTHER PUBLICATIONS

EP Search Report issued Apr. 14, 2016 in related EP Application No. 15184544.3.-1755 dated Mar. 14, 2016, 7 pages.
European Patent Application No. 14192466.2; office action dated Feb. 5, 2016; 7 pages.
Extended EP Search Report for related EP Application No. 12192967.3, dated Apr. 2, 2013; 8 pages.
Extended EP Search Report for related EP Application No. EP14192466.2; dated Apr. 9, 2015; 8 pages.
Extended European Search Report for related EP Application No. 14156987.1; dated Jan. 21, 2015; 8 pages.
Extended European Search Report for related EP Application No. 15173865.5; dated Nov. 23, 2015; 10 pages.
Gillespie, T.D.; "Fundamentals of Vehicle Dynamics"; Warrendale, PA; Society of Automotive Engineers; 1992; ISBN 1560911999, 9781560911999; pp. 205-206.
Hsu, Yung-Hsiang Judy, "Estimation and Control of Lateral Tire Forces using Steering Torque"; Dissertaion of Stanford University, Mar. 2009; 191 pages.
J.C.F. de Winter, et al.; "A Two-Dimensional Weighting Function for a Driver Assistance System"; IEEE Transactions on Systems, Man and Cybernetics B, Cybern., vol. 38, No. 1, pp. 189-198, Feb. 2008.
Katzourakis, D.I., et al.; "Road-Departure Prevention in an Emergency Obstacle Avoidance Situation"; IEEE Transactions on Systems, Man, and Cybernetics: Systems; vol. 44, Issue 5; vol. 44, No. 5, pp. 621-629.
Peroutka, et al., Design Considerations for Control of Traction Drive with Permanent Magnet Synchronous Machine; Power Electronics and MOtion Control Conference, 2008, EPE-PEMC 2008, 13th Year: 2008; pp. 1529-1534, DOI: 10.1109/EPEPEMC.2008.4635484.
Pornsarayouth, S., et al., Sensor Fusion of Delay and Non-delay Signal using Kalman Filter with Moving Covariance, Robotics and Biomimetics, 2008, ROBIO 2008, IEEE International Conference on: Year 2009; pp. 2045-2049, DOI: 10.1109/ROBIO.2009.4913316.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Wilhelm, et al., Friction Compensation Control for Power Steering, Control Systems Technology, IEEE Transactions on; Year: 2015, vol. PP, Issue: 99; pp. 1-14, DOI:10.1109/TCST.2015.2483561.
CN Application No. 2014106438448 Second Office Action, dated Apr. 24, 2017, 9 pages.
CN Application No. 201510617600 Office Action dated Apr. 12, 2017, 8 pages.
CN Application No. 201510742251 First Office Action dated Apr. 26, 2017, 8 pages.
CN Patent Application No. 201210586416.7 4th Office Action dated Sep. 21, 16, 8 pages.
English Translation of Chinese Office Action for related CN Application No. 201410643844.8; dated Aug. 22, 2016; 26 pages.

* cited by examiner

DISABLING CONTROLLED VELOCITY RETURN BASED ON TORQUE GRADIENT AND DESIRED VELOCITY ERROR

CROSS-REFERENCES TO RELATED APPLICATIONS

This patent application claims priority to U.S. patent application Ser. No. 14/933,461, filed Nov. 5, 2015, which claims priority to U.S. Provisional Patent Application Ser. No. 62/213,919, filed Sep. 3, 2015, both of which are incorporated herein by reference in their entirety.

BACKGROUND OF THE INVENTION

The present invention relates to a control system for an electric power steering system, and more particularly to a control system for estimating a driver torque based on a model based estimation and for disabling controlled velocity return.

An electric power steering (EPS) system may employ a torque sensor located between a steering column and a rack and pinion assembly. The torque sensor can measure the torque applied at the pinion and also serve as an approximation of the input torque applied to the steering wheel by the vehicle operator (e.g. driver). The output of the torque sensor may be used in calculations to determine an amount of assist torque provided by the motor.

Although the torque sensor can approximate the driver torque during steady state operations, the torque sensor measurement typically deviates from the driver torque during dynamic transients or during large rack force disturbances, such as when a driver releases the steering wheel, or when a driver subjects the vehicle to driving on a bumpy road, for example. A driver torque sensor can be added on the steering wheel to allow for an accurate measurement at an increased cost. Accordingly, it is desirable to accurately estimate a driver torque in electric power steering system.

SUMMARY OF THE INVENTION

In one embodiment, a power steering system comprises a gain module that generates an estimated driver torque, and a blending module for determining a blend value, the blend value is based at least in part on a derivative of the estimated driver torque, the blend value is applied to a return torque of a handwheel.

In another embodiment, a method for controlling a power steering system comprises generating an estimated driver torque; and determining a blend value, the blend value is based at least in part on a derivative of the estimated driver torque, the blend value is applied to a return torque of a handwheel.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
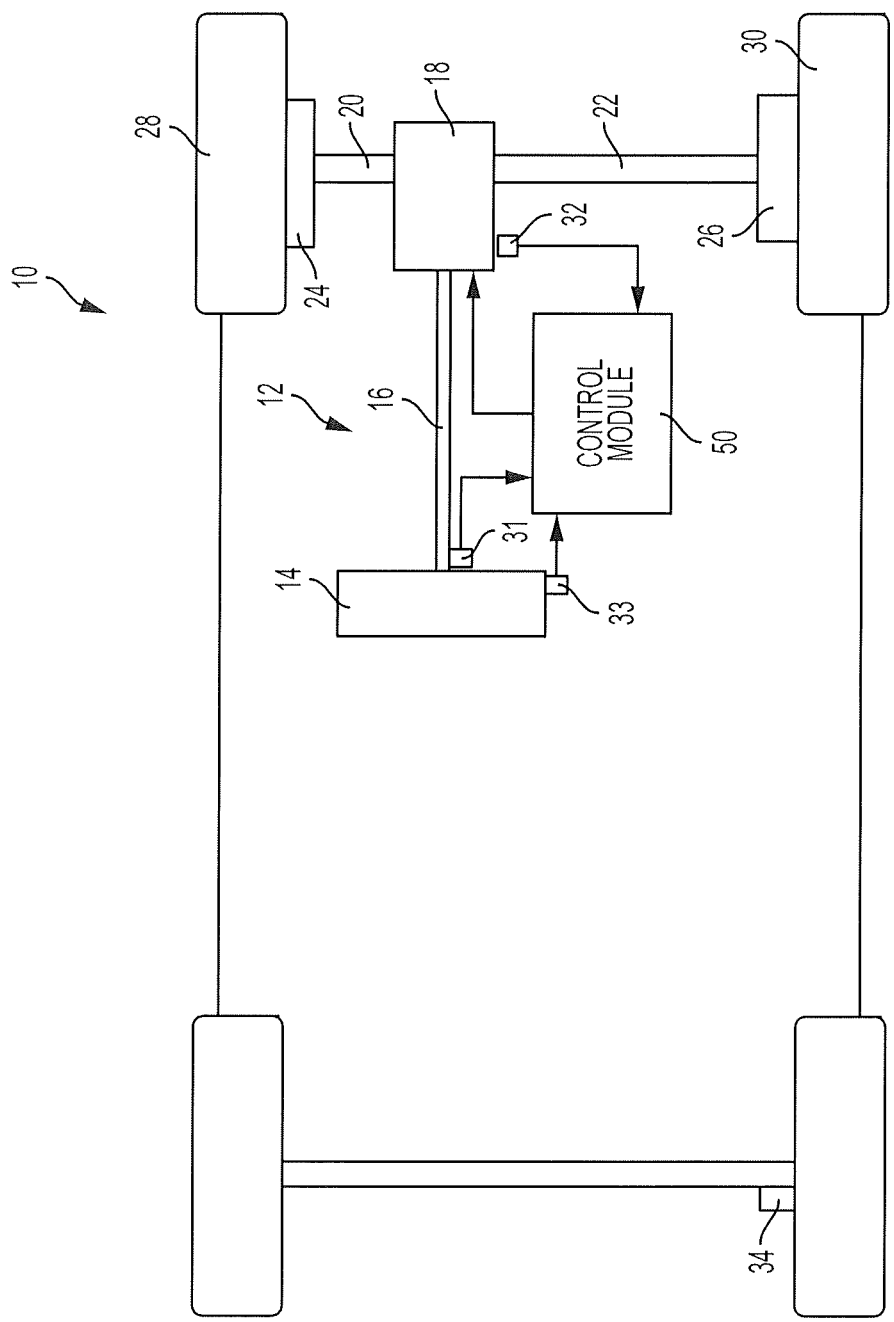
FIG. 1 illustrates a functional block diagram illustrating a vehicle including a steering system in accordance with one embodiment of the disclosure.

Referring now to the Figures, where the invention will be described with reference to specific embodiments, without limiting same, an exemplary embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to a left tie rod 20 and a right tie rod 22 of the vehicle 10. It should be noted that the steering system 12 may be a rack assist EPS (REPS) as well. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the left tie rod 20 and the right tie rod 22 which in turn moves left and right steering knuckles 24, 26, respectively. The left knuckle 24 is coupled to a left roadway wheel 28, and the right knuckle 26 is coupled to a right roadway wheel 30 of the vehicle 10.

As shown in FIG. 1, the vehicle 10 further includes various sensors 31-34 that detect and measure signals of the steering system 12 and/or of the vehicle 10. The sensors generate sensor signals based on the measured signals. In one embodiment, a torque sensor 31 is provided for sensing a torque placed on the handwheel 14. In the exemplary embodiment as shown, the torque sensor 31 is placed on the handwheel 14, however it is to be understood that the torque sensor 31 may not always be placed near or on the handwheel 14. In one embodiment, the motor position/velocity sensor 32 senses motor position and/or velocity, and the handwheel position/velocity sensor 33 senses handwheel position and/or velocity. In addition, the vehicle 10 may include a wheel speed sensor 34 to assist in measuring vehicle speed. In the embodiment shown in FIG. 1, a single wheel speed sensor 34 is attached near a rear wheel of the vehicle 10. Although a single wheel speed sensor 34 is shown in FIG. 1, a plurality of wheel speed sensors may also be included. The wheel speed sensor 34 may be located on a transmission case and be driven by an output gear of a transmission of the vehicle 10.

A control module 50 controls the operation of the steering system 12 based on one or more of the sensor signals and further based on the steering control systems and methods of the present disclosure. In one embodiment, the control module 50 includes a driver torque estimation module 60. The driver torque estimation module 60 receives input signals that are measured signals of the EPS system. The driver torque estimation module 60 may estimate a driver torque based on the input signals received from a plurality of sensors, for example. The input signals can include but are not limited to a motor command, a t-bar torque signal as measured by the torque sensor 31 on the pinion or handwheel 14, a motor position signal and a motor velocity signal.

Figure 2:
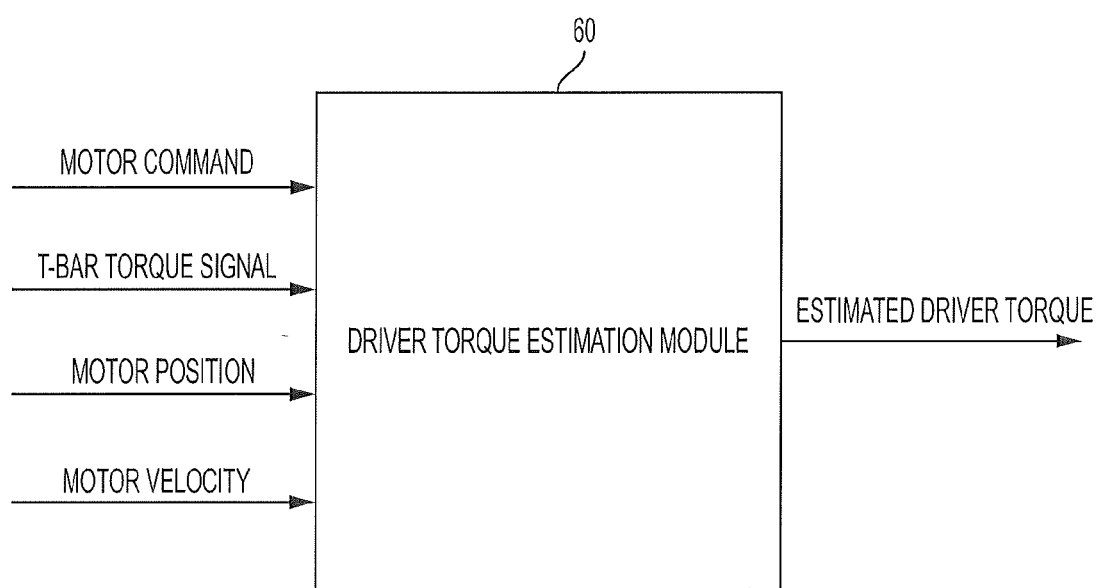
FIG. 2 illustrates a block diagram of a driver torque estimation module in accordance with one embodiment of the disclosure.

FIG. 2 illustrates an embodiment of a driver torque estimation module 60 of the control module 50 of FIG. 1. In various embodiments, the control module 50 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, or other suitable components that provide the described functionality. As can be appreciated, the module shown in FIG. 2 may be further partitioned.

Inputs to the control module 50 may be generated from the torque sensor 31 (FIG. 1) of the vehicle 10 (FIG. 1) as well as the motor position/velocity sensor 32. In addition, the inputs may be received from other control modules (not shown) within the vehicle 10 (FIG. 1), and may be modeled or predefined. Alternatively, the control module 50 may receive handwheel position/velocity signals from the handwheel position/velocity sensor 33. The handwheel position/velocity signals are scaled to motor coordinates, instead of these signals being directly provided by motor position/velocity sensor 32.

In FIG. 2, the driver torque estimation module 60 receives a plurality of input signals. In some embodiments, the input signals include a motor command, a t-bar torque signal as measured by a torque sensor, for example, a motor position signal and a motor velocity signal. The torque sensor providing the t-bar torque signal may be located on the pinion or close to a steering column. In some embodiments, the t-bar torque signal is measured from a torsion bar on the handwheel. However, it is contemplated and understood that t-bar torque signal may be generated from any type of torque sensor.

The input signals are typically scaled in the handwheel coordinate, as some of the signals may have been originally provided in a motor coordinate by respective sensors. In some embodiments, the input signals are scaled into the handwheel coordinate by a mechanical ratio N and gear efficiency $\epsilon$. Alternatively or additionally, the input signals provided to the driver torque estimation module 60 can include a reference motor current signal, a measured motor current signal, a measured handwheel position, measured handwheel velocity, and a calculated motor torque, among other signals.

The measured input signals are used by the driver torque estimation module 60 to determine an estimated driver torque signal. The estimated driver torque signal can be used by the power steering system for further compensation of the handwheel and the EPS. In some embodiments, a three-mass mechanical model of the EPS system can be stored in the driver torque estimation module 60. The three-mass mechanical model can be used to represent system dynamics in the determination of the driver torque estimation. A three-mass EPS mechanical model is described in SAE 1999-01-0399, Badawy et al., Modeling and Analysis of an Electric Power Steering System, which is incorporated by reference herein. However, other mass models (e.g. one mass model, two mass model, ten mass model, etc.) may be used by the driver torque estimation module 60 in the estimation of the driver torque. The driver torque observer may use the mechanical model to determine the driver torque estimation based on the input signals. In some embodiments, the three mass model may take into account rack inertia, handwheel inertia, and motor inertia, among other factors. The mechanical model can be represented by a state space model based on the following state space equations:

$$\dot{x}(t)=Ax(t)+Bu(t) \quad \text{(Equation 1)}$$

$$y(t)=Cx(t) \quad \text{(Equation 2)}$$

In Equation 1, u(t) is an input vector as a function of motor torque, x(t) is an extended state vector as a function of handwheel position, handwheel velocity, motor position, motor velocity, rack position, rack velocity, driver torque. In Equation 2, y(t) is an output vector as a function of handwheel torque, motor position, and motor velocity. A, B, and C are matrices of the state space equations.

The driver torque estimation module 60 estimates non-measured states of the EPS system. In some embodiments, the driver torque estimation module 60 can use an extended state vector that includes an estimated driver torque state. The driver torque estimation module 60 is shown in more detail in FIG. 3.

Figure 3:
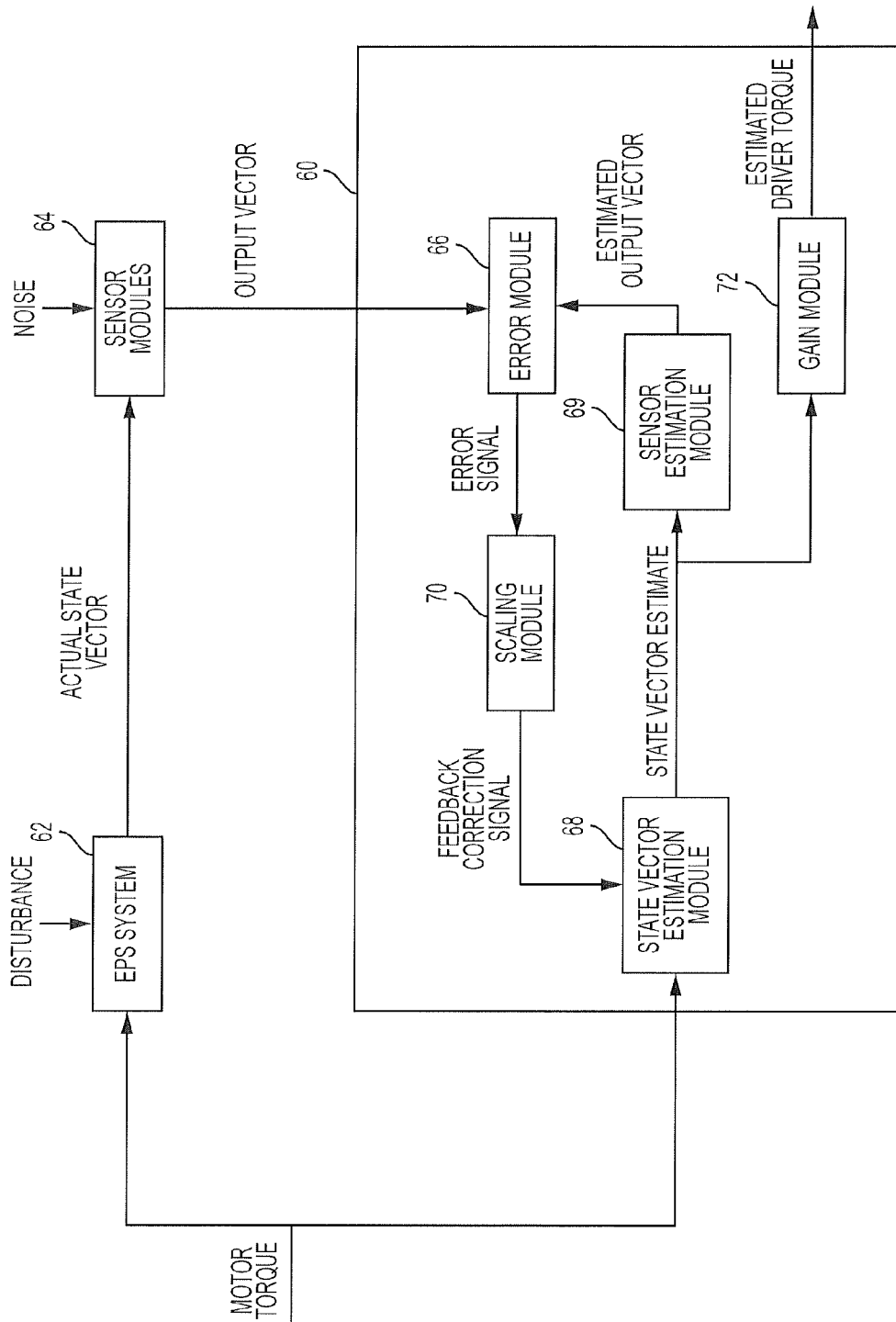
FIG. 3 illustrates a dataflow diagram of the driver torque estimation module in accordance with one embodiment of the disclosure.

FIG. 3 illustrates the driver torque estimation module 60 in accordance with one embodiment of the invention. The driver torque estimation module 60 analyzes the received input signals to calculate an estimated driver torque. The estimated driver torque may closely approximate an actual driver torque due to the algorithms employed by the driver torque estimation module 60.

In operation, a motor torque may be applied to an EPS system 62 by a permanent magnet synchronous motor. The EPS system 62 may be subject to a disturbance, including but not limited to, road jarring or a release of the handwheel by a driver during a steering operation. Accordingly, the actual driver torque acting on the EPS system may be affected by the disturbance.

The actual driver torque acting on the EPS system 62 may be measured by sensor modules 64, which may include any number of sensors including the sensors shown in FIG. 1. The sensor modules 64 may analyze an actual state vector that includes the actual driver torque to determine a handwheel position, motor position and motor velocity of the EPS system. T-bar torque is also received and analyzed by the sensor modules 64. The driver torque estimation module 60 receives the handwheel position, t-bar torque, motor position and motor velocity from the sensor modules 64. In one embodiment, the sensor modules 64 output the received signals that can be represented as an output vector, but other representations are possible. As described in more detail below, the output vector is analyzed by an error module 66 of the driver torque estimation module 60.

The error module 66 receives the output vector and an estimated output vector as inputs. The error module 66 calculates an error signal that represents a difference between the output vector and the estimated output vector. The estimated output vector may represent selected estimated sensor signals, where the output vector may represent the actual signals provided by the sensor modules 64. The error signal is sent to the scaling module 70, which calculates a feedback correction signal.

In operation, the scaling module 70 scales the error signal to generate the feedback correction signal. In one embodiment, the feedback correction signal represents errors between measured and estimated values of handwheel torque, motor position, and motor velocity signals that have been scaled. To generate the feedback correction signal, the scaling module 70 multiplies the error signal by an observer gain value. The observer gain value may be a matrix designed at least in part using steady-state Kalman filtering or pole-placement method, as described by Gene F. Franklin, J. David Powell, and Abbas Emami-Naeini, "Feedback control of dynamics systems." *Pretince Hall Inc* (2006), Gene F. Franklin, J. David Powell, and Michael L. Workman. *Digital control of dynamic systems*. Vol. 3. Menlo Park: Addison-Wesley, 1998, both of which are incorporated by reference herein.

The feedback correction signal generated by the scaling module 70 reduces the difference of the estimated output vector and the output vector by driving the error signal to approach zero.

In part, by allowing the feedback correction signal to approximate a zero error signal (e.g. zero value), the driver torque estimation module 60 estimates a driver torque that tracks the actual driver torque. The estimation of the driver torque is determined without an additional sensor specifically to measure the driver torque.

The feedback correction signal is sent to the extended state vector estimation module 68. The extended state vector estimation module 68 generates an extended state vector estimate.

In addition to receiving the output vector from the sensor modules 64, the driver torque estimation module 60 receives the motor torque command. In some embodiments, the motor torque command may be received by the state vector estimation module 68 of the driver torque estimation module 60.

The extended state vector estimation module 68 applies the motor torque command to a set of extended state space equations, which in one embodiment can include the equations described in equations 1 and 2. The extended state vector estimation module 68 further applies a feedback correction signal estimated by the scaling module 70 to the extended state space equation, thereby generating the extended state vector estimate. The extended state vector estimate may be represented by x̂(t), which in some embodiments, is a function of handwheel position (x_hw), handwheel velocity (ẋ_hw), motor position (x_mot), motor velocity (ẋ_mot), rack position (x_am), rack velocity (ẋ_am), and driver torque (T_dr).

$$\hat{\dot{x}}(t)=A\hat{x}(t)+Bu(t)+L(y-\hat{y})$$ (Equation 3)

The extended state vector estimate is sent to a sensor estimation module 69, which uses the extended state vector estimate to calculate the estimated output vector. In some embodiments, the sensor estimation module 69 selectively filters the extended state vector estimate. Thus, the signals of the estimated output vector may correspond to the signals of the output vector. In some embodiments, the sensor estimation module 69 applies a selection matrix to reduce the extended state vector estimate to the estimated output vector.

The extended state vector estimate acts to reduce a magnitude of the error signal. The extended state vector estimate approaches the actual state vector. In some embodiments, the extended state vector estimate is multiplied by a fixed gain value by a gain module 72, to generate an estimated driver torque.

As noted above, the estimated output vector may represent an estimated t-bar torque, an estimated motor position, and an estimated motor velocity. However, it is further contemplated and understood that the error module may receive an estimated output vector and an output vector that include other EPS signals.

Figure 4:
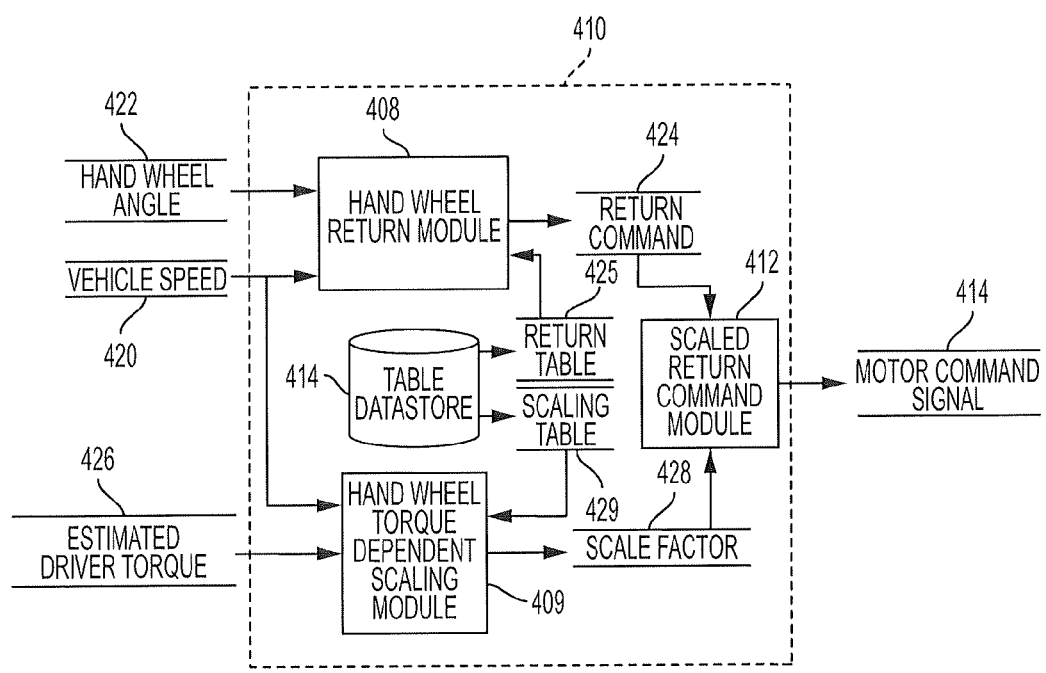
FIG. 4 illustrates a dataflow diagram of an estimated driver torque applied to a steering controller in a feedforward return function in accordance with one embodiment of the disclosure.

Referring to FIG. 4, the estimated driver torque produced by the driver torque estimation module 60 may be used to replace the handwheel torque as an input to the controller 410. The replacement of the handwheel torque with the estimated driver torque can produce faster return performance. Specifically, a hand wheel torque dependent scaling module 409 of the controller 410 may receive an estimated driver torque signal 426 instead of a torque signal from torsion bar sensor. Accordingly, an additional torque is not needed to acquire the torque data required by the hand wheel torque dependent scaling module 409.

In particular, inputs to the controller 410 of the control module 50 (FIG. 1) can be generated from the sensors 30-34 (FIG. 1) of the vehicle, can be modeled, and/or can be predefined. In this example, the controller 410 includes a hand wheel return module 408, a hand wheel torque dependent scaling module 409, a scaled return command module 412, and a table datastore 414, as shown in FIG. 4.

The hand wheel return module 408 receives as input vehicle speed 420 and hand wheel angle 422. The hand wheel angle 422 may be, for example, an angular position of the hand wheel relative to the center position of the hand wheel. The hand wheel return module 408 determines a return command 424 based on the vehicle speed 420 and the hand wheel angle 422. In various embodiments, the hand wheel return module 408 determines the return command 424 using one or more hand wheel return lookup tables 425. The lookup tables 425 can be indexed by the vehicle speed 420 and/or the hand wheel angle 422. The lookup tables 425 can be stored in and accessed from the table datastore 414.

In one example, the hand wheel return module 408 is associated with nine return tables 425. A vehicle speed 420 is defined for each of the nine return tables. A return curve is defined by the data points in the nine return tables. For example, each of the nine return curves is composed of sixteen data points. The data points are defined by the axis, where the axis is defined by hand wheel angle 422. In one example, the hand wheel angle 422 can range from zero to nine-hundred degrees. In various embodiments, the axis can be selectable. In various embodiments, all return curves share a common axis. As can be appreciated, the data of the return curves can be increasing or decreasing. The speed defined for curve zero can be used as a return speed breakpoint (e.g., return command is ramped to zero below the breakpoint speed).

Figure 5:
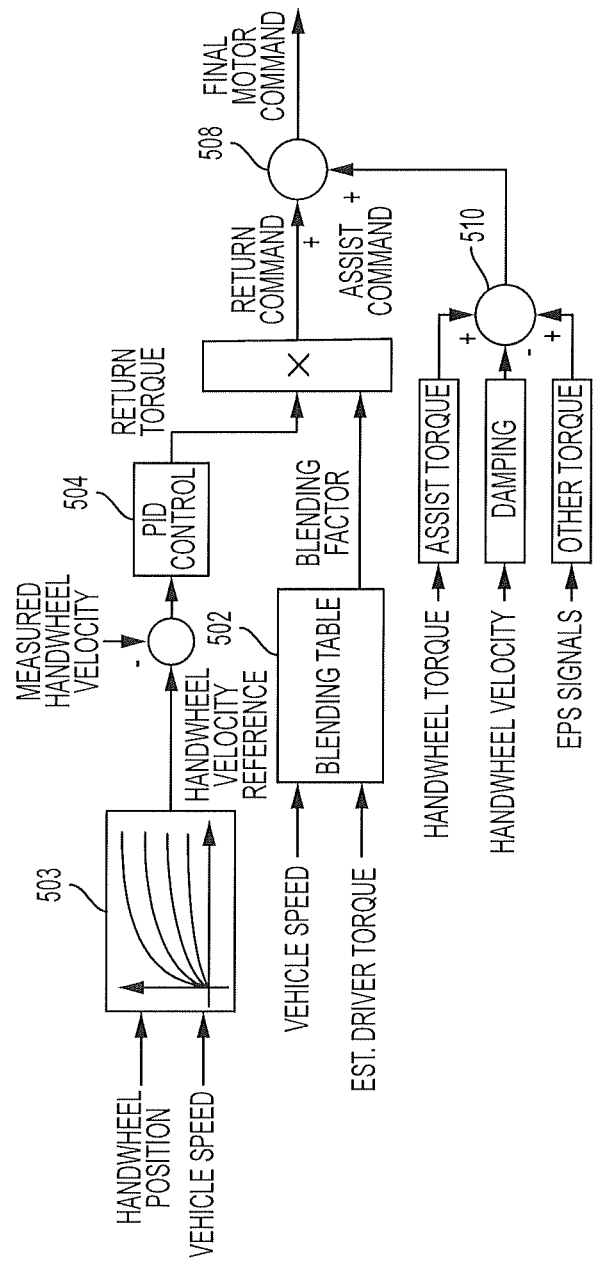
FIG. 5 illustrates a dataflow diagram of the estimated driver torque in a controlled velocity function in accordance with one embodiment of the disclosure.

As shown in FIG. 5, the estimated driver torque calculated by the driver torque estimation module 60 (FIG. 2) can be transmitted to a blending table 502. FIG. 5 illustrates the controlled velocity return function of the disclosure in more detail. In addition, the driver torque estimation module 60 can be included in the blending table to assist in the creation of a blending factor. The blending table 502 creates a blending factor based on the vehicle speed and estimated driver torque.

The blending strategy described in FIG. 5 further includes a handwheel velocity lookup table 503 that creates a handwheel velocity reference signal as a function of the handwheel position and vehicle speed. The handwheel velocity reference signal is compared with the measured handwheel velocity and output to a PID control 504. The PID control 504 evaluates the output, and generates a return torque. The return torque is multiplied by the blending factor at multiplier 506 to generate a return command. The return command is added to an assist command at adder 508, which is a function of assist torque, a damping value, and any other EPS signals summed at summation block 510. A final motor command is generated by combining the assist command with the return command. As shown, the system described in FIG. 5 is applicable to a controlled velocity return function, which requires a steering wheel to return to a center position at a pre-defined velocity when the driver's hands are not present on the steering wheel. The EPS determines that a driver's hands are no longer present on the wheel, and generates a motor torque to assist the return of the wheel to a center position. The absence of a driver's hands on the wheel is detected slower than desired when using t-bar torque. This is because of a time lag between the actual hands-off wheel event, and the decrease of the t-bar torque to a zero value. The t-bar torque is affected not only by driver torque but also handwheel inertia, damping, and other forces and assemblies in communication with the EPS. Following a hands off wheel event, driver torque typically decreases to a zero value more quickly than a t-bar torque. Thus, the driver torque can be used in one embodiment to responsively enable an assist torque. This allows a steering wheel to return to a center position after a minimal unassisted time interval. The implementation of the driver torque estimation module in a blending table to enable a smooth return of the handwheel to a center position.

Figure 6:
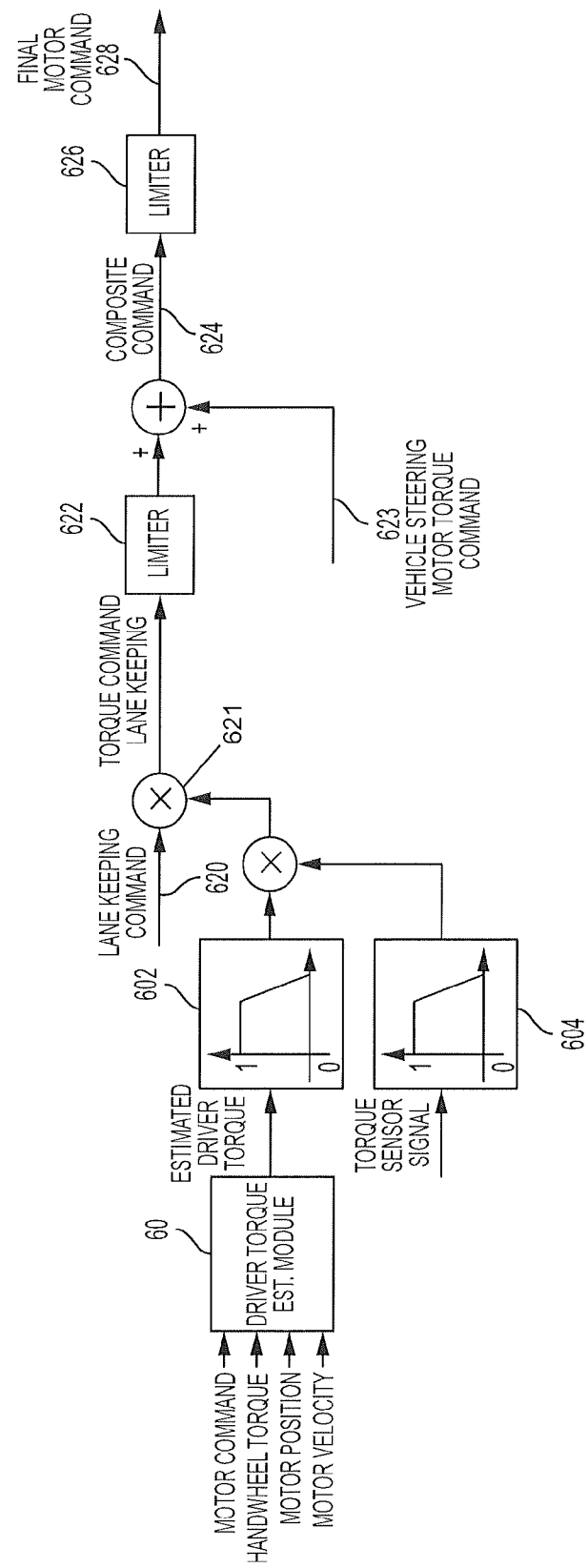
FIG. 6 illustrates a dataflow diagram of the driver torque estimation module implemented in an automated driver assistance system in accordance with one embodiment of the disclosure.

Referring now to FIG. 6, a dataflow diagram illustrates an embodiment of a submodule of the control module 50 (FIG. 1) used to control a steering system in an advanced driver assistance system. The driver torque estimation module 60 can also be implemented in a fully autonomous or other semi-autonomous vehicle system. The driver torque estimation module 60 generates an estimated driver torque signal, which is sent to blend lookup table 602. The blend lookup table 602 uses the estimated driver torque signal to produce a scalar blend value. This scalar blend value is multiplied with the torque scalar blend value produced by a torque scalar lookup table 604. A t-bar torque measured by torque sensor is used by table 604 to produce the torque scalar blend value. The scalar multiplier is multiplied with a lane keeping command 620 at junction 621 to generate a lane keeping torque command. A limiter 622 clamps the magnitude of the lane keeping torque command. The lane keeping torque command is added to a vehicle steering motor torque command 623, to generate a composite motor command 624. A second limiter 626 clamps the composite motor command 624 to generate a final motor command 628.

Figure 7:
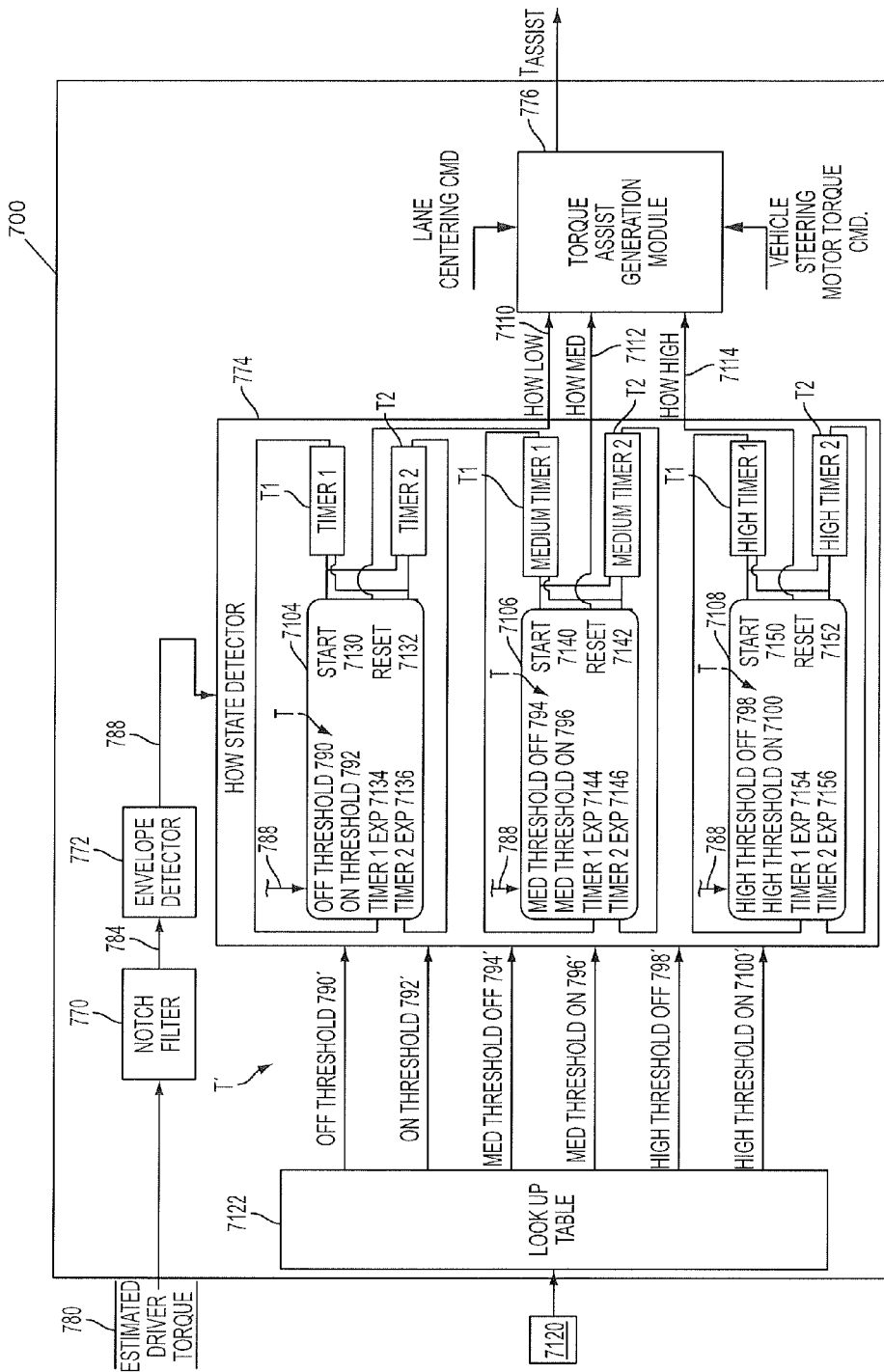
FIG. 7 illustrates a dataflow diagram of the driver torque estimation module in an automated driver assistance system in accordance with one embodiment of the disclosure.

Referring to FIG. 7, the estimated driver torque generated by the driver torque estimation module 60 can be applied to a hands off wheel detection module 700. In operation, the estimated driver torque 780 is filtered and processed by the hands off wheel detection module 700. The hands off wheel detection module 700 further analyzes the vehicle speed sent from a vehicle speed sensor. A series of timer and threshold detectors are applied by the hands off wheel detection module 700 to generate a torque assist signal.

FIG. 7 is a block diagram of a hands off wheel calculation module 700 of the control module 50 (FIG. 1). The hands off wheel calculation module 700 illustrates one approach for determining a hands off wheel (HOW) condition. In the embodiment as shown, the hands off wheel calculation module 700 includes a notch filter 770 (also referred to as a band-stop filter), an envelope detector 772, a HOW state detector 774, and a torque assist generation module 776.

The hands off wheel calculation module 700 receives an estimated driver torque signal 780 from the driver estimation module 60 (FIG. 2) instead of a torque signal from a torque sensor located in a vicinity of a handwheel. Accordingly, a signal indicative of the amount of torque exerted on a hand wheel is not required by the hands off wheel calculation module 700. The notch filter 770 receives the estimated driver torque 780 as an input. The notch filter 770 may be any type of filtering device configured to remove or attenuate a band or range of frequencies in the estimated driver torque 780 that represent a normal column mode frequency, and produces as output a filtered estimated driver torque signal 784. The normal column mode frequency represents the vibrational modes that a hand wheel and a steering shaft operate within, if a driver has not placed his or her hands on the hand wheel (e.g., a hands off wheel condition). As will be further described herein, hands off wheel calculation module 700 contemplates that the hands off wheel condition exists if the HOW condition is not detected. For example, in one embodiment, the normal column mode frequency may range from about 8 Hertz to about 15 Hertz. The normal column mode may be adjusted based on the type of torque sensor that is provided (e.g., a compliant torque sensor versus a non-compliant torque sensor). The filtered estimated driver torque signal 784 is then sent to the envelope detector 772.

The envelope detector 772 determines an envelope of the filtered estimated driver torque signal 784, and produces a HOW detection signal 788 as output. The HOW detection signal 788 represents the envelope E of the filtered estimated driver torque signal 784 at a given point in time. The envelope detector 772 may use any number of envelope detection approaches to determine the HOW detection signal 788. For example, in software-based approach the envelope detector 772 passes the filtered estimated driver torque signal 784 to a low pass filter (not illustrated), and then determines an absolute value of the filtered estimated driver torque signal 784. The HOW detection signal 788 is then sent to the HOW state detector 774.

The HOW state detector 774 monitors the HOW detection signal 788 and determines if the HOW condition exists based on comparing the value of the HOW detection signal 788 with a threshold torque value over a predetermined time interval. If the HOW condition is determined to exist, then a HOW Low signal 7110 is generated by the HOW state detector 774 and sent to the torque assist generation module 776. In one embodiment, the HOW state detector 774 may determine the level of force a driver may have on the hand wheel. For example, a HOW medium signal 7112 indicates a relatively moderate level of force, and a HOW high signal 7114 indicates a relatively high level of force. If the state detector 774 does not send either the HOW low signal 7110, the HOW medium signal 7112, or the HOW high signal 7114 to the torque assist generation module 776, then the hands off wheel condition exists. In the exemplary embodiment as shown in FIG. 7, the HOW state detector 774 includes an ON/OFF sub-module 7104, a medium sub-module 7106, and a high sub-module 7108. The ON/OFF sub-module 704 is used to generate the HOW low signal 7110, the medium sub-module 7106 is used to determine the HOW medium signal 7112, and the high sub-module 7108 is used to generate the HOW high signal 7114. As the level of force estimated as being exerted by a driver increases (e.g., a relatively moderate level of force indicated by the HOW medium signal 7112, or a relatively high level of force indicated by the HOW high signal 7114), the driver estimation module 60 may predict with a higher confidence level that the HOW condition actually exists. For example, the HOW medium signal 7112 indicates the HOW condition exists with relatively more certainty or confidence when compared to the HOW low signal 7110.

In the embodiment as shown in FIG. 7, six threshold torque values T' are used by the HOW state detector 774, however it is to be understood that any other number of threshold torque values may be used as well. The ON/OFF sub-module 7104 includes an OFF threshold value 790' and an ON threshold value 792'. The OFF threshold value 790' indicates a driver does not have his or her hands on the hand wheel, and the ON threshold value 792' indicates a driver has his or her hands on the hand wheel. The medium sub-module 7106 includes a Medium Threshold OFF value 794' and a Medium Threshold ON value 796'. The Medium Threshold OFF value 794' and the Medium Threshold ON value 796' are indicative of a moderate level of force by a driver on the hand wheel. The high sub-module 7108 includes a High Threshold OFF value 798' and a High Threshold ON value 7100'. The High Threshold OFF value 798' and the High Threshold ON value 7100' are indicative of a high level of force by a driver on the hand wheel. In one exemplary embodiment, the OFF threshold value 790' is about 0.175 Nm, the ON threshold value 792' is about 0.7 Nm, the Medium Threshold OFF value 794' is about 0.8 Nm, the Medium Threshold ON value 796' is about 1.0 Nm, the High Threshold OFF value 798' is about 1.1 Nm, and the High Threshold ON value 7100' is about 1.5 Nm, however it is to be understood that other torque values may be used as well.

In one embodiment, the threshold torque values T' may be adjusted based on the speed of the vehicle. The speed of the vehicle is monitored by the vehicle speed sensor. The driver estimation module 60 receives as input a vehicle speed signal 7120 from the vehicle speed sensor. The vehicle speed signal 7120 is sent to a lookup table 7122. The lookup table 7122 is used to determine modified torque threshold values T' based on the vehicle speed signal 7120. The modified torque threshold values T' are then sent to the HOW state detector 774. Specifically, the modified torque threshold values T' include an OFF threshold value 790', an ON threshold value 792', a Medium Threshold OFF value 794', a Medium Threshold ON value 796', a High Threshold OFF value 798', and a High Threshold ON value 7100'. The modified torque threshold values T' may be used in place of the torque threshold values T by the state detector 774.

A first timer T1 and a second timer T2 are provided for each of the ON/OFF sub-module 7104, the medium sub-module 7106, and the high sub-module 7108. Specifically, the ON/OFF sub-module 7104 is in communication with a first timer T1 and a second timer T2, the medium sub-module 7106 is in communication with a medium first timer T1 and a medium second timer T2, and the high sub-module 7108 is in communication with a high first timer T1 and a high second timer T2.

The ON/OFF sub-module 7104 of the HOW state detector 774 monitors the HOW detection signal 788 until the ON/OFF sub-module 7104 determines that the HOW detection signal 788 is greater than the ON threshold value 792. Upon determining the HOW detection signal 788 exceeds the ON threshold value 792, the ON/OFF sub-module 7104 sends a start timer signal 7130 to both the first timer T1 and the second timer T2. The first timer T1 is configured to count up from a first interval of time when receiving of the start timer signal 7130, and the second timer T2 is configured to count up from a second interval of time when receiving of the start timer signal 7130. The first interval of time and the second interval of time are calibratable values that maybe adjusted based on the type of application. In one embodiment, the first interval of time of the first timer T1 is less than the second interval of time of the second timer T2. The ON/OFF sub-module 7104 continues to monitor the HOW detection signal 788 as the first timer T1 counts up from the first interval of time. It should be noted that the first timer T1 and the second timer T2, the medium first timer T1, the medium second timer T2, the high first timer T1 and the high second timer T2 each run concurrently with one another.

The first timer T1 sends a Timer 1 expired signal 7134 to the ON/OFF sub-module 7104 once the first interval of time has expired. Once the Timer 1 expired signal 7134 is received by the ON/OFF sub-module 7104, then the ON/OFF sub-module 7104 determines if the HOW detection signal 788 has remained above the ON threshold value 792 during the first interval of time. If the HOW detection signal 788 has remained above the ON threshold value 792 during the first interval of time, then the HOW condition exists. The state detector 774 is set to a HOW=1 state (e.g., a HOW On state exists), and the ON/OFF sub-module 7104 generates the HOW low signal 7110. The ON/OFF sub-module 7104 may also send a reset signal 7132 to the first timer T1 and the second timer T2. The reset signal 7132 initializes the first timer T1 back to time=0. The reset signal 7132 causes the second timer T2 to cease counting up, and initializes the second timer T2 back to time=0.

If the HOW detection signal 788 does not remain above the ON threshold value 792 during the first interval of time and the reset signal 7132 is not sent, the second timer T2 may continue to count up until the second interval of time has lapsed, and a Timer 2 expired signal 7136 is then sent to the ON/OFF sub-module 7104. Once the Timer 2 expired signal 7136 is received by the ON/OFF module 7104, then the ON/OFF sub-module 7104 determines if the HOW detection signal 788 has remained below the OFF threshold value 790 during the second interval of time. If the HOW detection signal 788 has remained below the OFF threshold value 790 during the second interval of time, then the HOW condition does not exist. The ON/OFF sub-module 7104 may then send the reset signal 7132 to initialize the first timer T1 and the second timer T2.

A similar approach may be used to generate the HOW medium signal 7112 by the medium sub-module 7106. The medium sub-module 7106 may monitor the HOW detection signal 788. Upon determining the HOW detection signal 788 is greater than the Medium threshold ON value 796, the medium sub-module 7106 sends a start timer signal 7140 to both the medium first timer T1 and the medium second timer T2. The medium sub-module 7106 continues to monitor the HOW detection signal 788 as the first timer T1 counts up from the first interval of time.

The medium first timer T1 sends a Timer 1 expired signal 7144 to the medium sub-module 7106 once the first interval of time has expired. Once the Timer 1 expired signal 7144 is received by the medium sub-module 7106, then the medium sub-module 7106 determines if the HOW detection signal 788 has remained above the Medium threshold ON value 796 during the first interval of time. If the HOW detection signal 788 has remained above the Medium threshold ON value 796 during the first interval of time, then the HOW condition exists. The state detector 774 is set to a HOW Medium state and generates the HOW Medium signal 7112. The medium sub-module 7106 may also send a reset signal 7142 to the medium first timer T1 and the medium second timer T2.

If the HOW detection signal 788 does not remain above the Medium threshold ON value 796 during the first interval of time and the reset signal 7142 is not sent, the medium second timer T2 may continue to count up until the second interval of time has lapsed, and a Timer 2 expired signal 7146 is then sent to the medium sub-module 7106. Once the Timer 2 expired signal 7146 is received by the medium sub-module 7106, then the medium sub-module 7106 determines if the HOW detection signal 788 has remained below the Medium threshold OFF value 794 during the second interval of time. If the HOW detection signal 788 has remained below the Medium threshold OFF value 794 during the second interval of time, then the HOW Medium condition does not exist. The medium sub-module 7106 may then send the reset signal 7142 to initialize the medium first timer T1 and the medium second timer T2.

A similar approach may be used to generate the HOW high signal 7114 by the high sub-module 7108. The high sub-module 7108 monitors the HOW detection signal 788, and upon determining the HOW detection signal 788 is greater than the High threshold ON value 7100, the high sub-module 7108 sends a start timer signal 7150 to both the high first timer T1 and the high second timer T2. The high sub-module 7108 continues to monitor the HOW detection signal 788 as the high first timer T1 counts up from the first interval of time.

The high first timer T1 sends a Timer 1 expired signal 7154 to the high sub-module 7106 once the first interval of time has expired. Once the Timer 1 expired signal 7154 is received by the high sub-module 7108, then the high sub-module 7108 determines if the HOW detection signal 788 has remained above the High threshold ON value 7100 during the first interval of time. If the HOW detection signal 788 has remained above the High threshold ON value 7100 during the first interval of time, then the HOW High condition exists. The state detector 774 is set to a HOW High state and generates the HOW High signal 7114. The high sub-module 7108 may also send a reset signal 7152 to the high first timer T1 and the high second timer T2.

If the HOW detection signal 788 does not remain above the High threshold ON value 7100 during the first interval of time and the reset signal 7152 is not sent, the second timer T2 may continue to count up until the second interval of time has lapsed, and a Timer 2 expired signal 7156 is then sent to the high sub-module 7108. Once the Timer 2 expired signal 7156 is received by the high sub-module 7108, then the high sub-module 7108 determines if the HOW detection signal 788 has remained below the High threshold OFF value 798 during the second interval of time. If the HOW detection signal 788 has remained below the High threshold OFF value 798 during the second interval of time, then the HOW condition does not exist, and the state detector 774 is not set to the HOW High state. The high sub-module 7108 may then send the reset signal 7152 to initialize the high first timer T1 and the high second timer T2.

The torque assist generation module 776 receives as input the HOW low signal 7110, the HOW Medium signal 7112, or the HOW high signal 7114 from the HOW state detector 774. The torque assist generation module 776 selectively generates the torque assist command Tassist to create torque nudges in the hand wheel while a lane monitoring system is in assist mode. Specifically, the torque assist generation module 776 may only generate the torque assist command Tassist in assist mode if one of the HOW low signal 7110, the HOW Medium signal 7112, or the HOW high signal 7114 is received from the HOW state detector 774. The torque assist generation module 776 may adjust the value of the torque assist command Tassist based on if the HOW low signal 7110, the HOW Medium signal 7112, or the HOW high signal 7114 is received. Specifically, the torque assist command Tassist increases as the level of force exerted on the hand wheel 734 increases. For example, if the HOW high signal 7114 is received, then torque assist command Tassist generated may be greater than if the HOW low signal 7110 was received. The HOW low signal 7110, the HOW Medium signal 7112, or the HOW high signal 7114 from the HOW state detector 774 may also be provided to a lane monitoring system, where the lane monitoring system may not switch from the assist mode to the autonomous mode unless the HOW condition exists (e.g., either the HOW low signal 7110, the HOW Medium signal 7112, or the HOW high signal 7114 is sent by the state detector 774).

Figure 8:
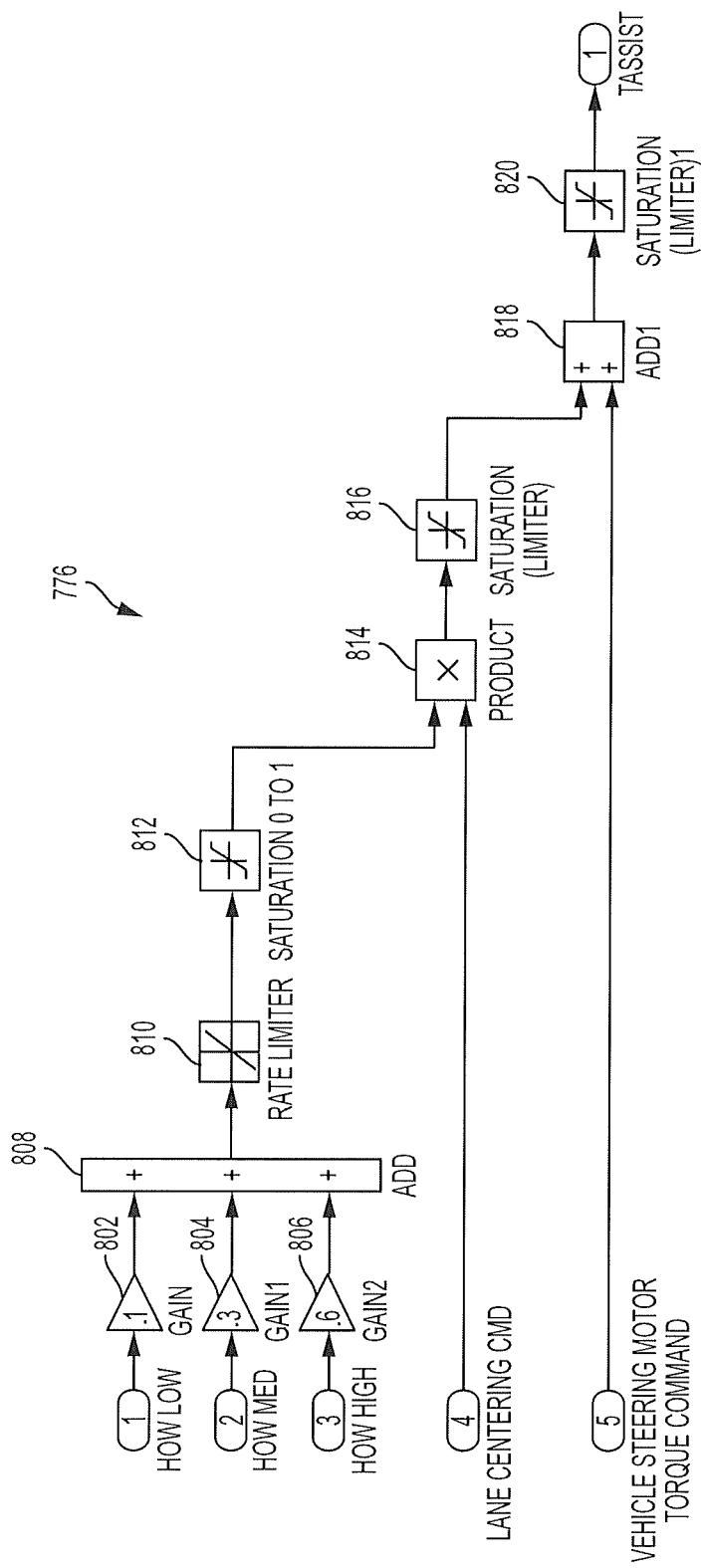
FIG. 8 illustrates a dataflow diagram of the torque assist generation module in accordance with one embodiment of the disclosure.

FIG. 8 illustrates a dataflow diagram of the torque assist generation module 776 in accordance with one embodiment of the disclosure.

In operation, the torque assist generation module 776 receives a HOW Low command, a HOW Med command, and a HOW High command. The HOW Low command, HOW Med command, and HOW High command are each multiplied by respective gain modules 802, 804 and 806. In one embodiment, gain module 802 multiplies HOW Low command by a value of 0.1, gain module 804 multiplies HOW Med command by a value of 0.3, and gain module 806 multiplies HOW High command by a value of 0.6. The outputs of gain modules 802, 804 and 806 are sent to adder 808, where the outputs are summed, and the sum of the adder 808 is sent to a rate limiter 810 that limits a rate of increase or decrease. The output of the rate limiter 810 is sent to saturation block 812, where a value of 0 to 1 is computed based on the value output from the rate limiter 810. A lane centering command is multiplied with the value output by the saturation block 812 at the product block 814. The product produced by the product block 814 is sent to the saturation limiter 816 to limit a saturation value produced by the product block 814. The output of the saturation limiter is then sent to an adder 818, where the output of the saturation limiter 816 is summed with a vehicle steering motor torque command. The output of the adder 818 is subjected to a second saturation limiter 820, which outputs the Tassist command.

Figure 9:
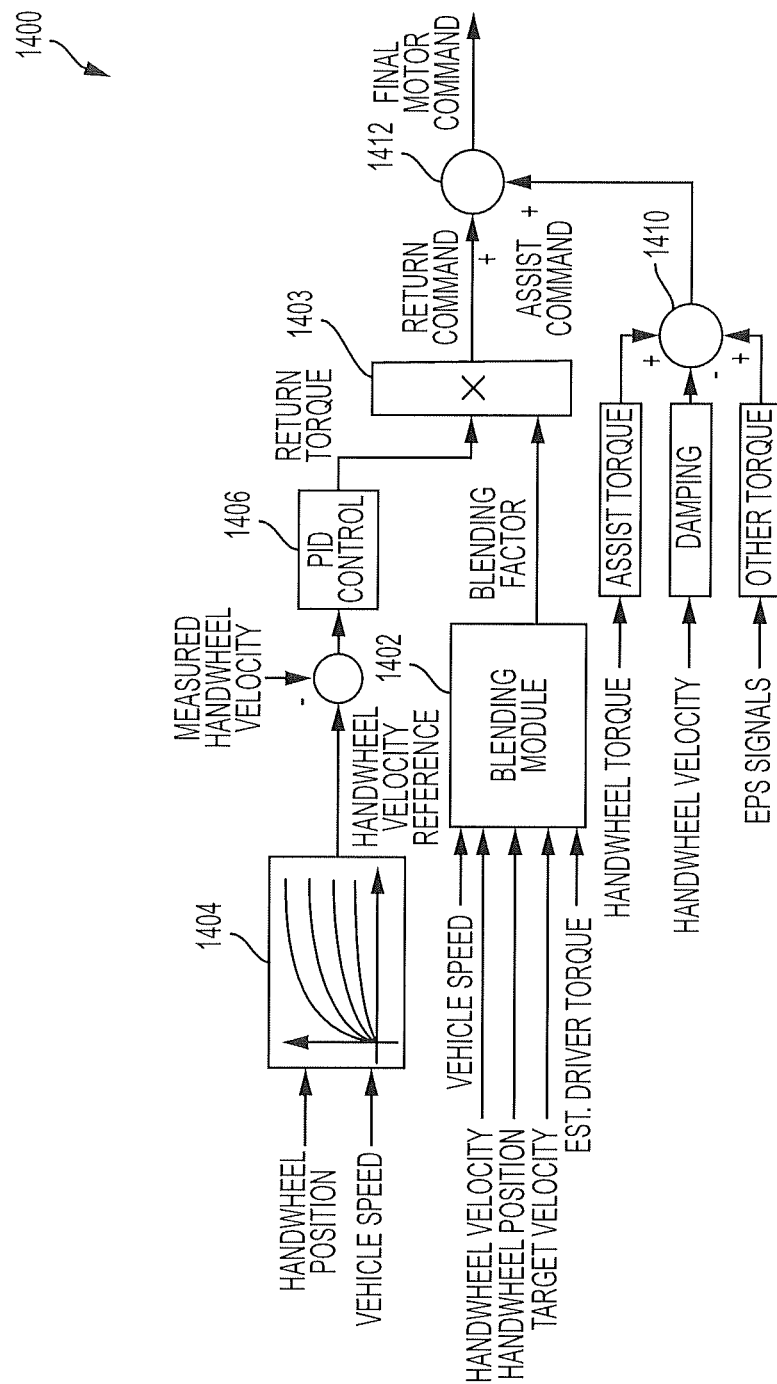
FIG. 9 illustrates a dataflow diagram of the blending module applied to the estimated driver torque in a controlled velocity function in accordance with one embodiment of the disclosure.

FIG. 9 illustrates controlled velocity return module 1400, which may be included in the control module 50 (FIG. 1) of the disclosure. As shown in FIG. 9, the estimated driver torque can be transmitted to a blending module 1402. The blending module 1402 outputs a blending factor that can selectively modify a return command produced at multiplier

1403. The blending factor can be determined based on at least one of the vehicle speed, estimated driver torque, handwheel velocity, handwheel position and a target velocity. The blending factor is a scaled value that can change as a function of estimated driver torque, a torque gradient, and a desired velocity error. The blending factor can reduce the inappropriate application of the return torque while improving steering feel, without the need for an additional sensor in the steering assembly to measure driver torque.

The controlled velocity return module 1400 may include a handwheel velocity lookup table 1404 that creates a handwheel velocity reference signal as a function of the handwheel position and vehicle speed. The handwheel velocity reference signal is compared with the measured handwheel velocity and output to a PID control 1406. The PID control 1406 evaluates the output, and generates a return torque. The return torque is multiplied by the blending factor at multiplier 1403 to generate a return command. The return command is added to an assist command at adder 1412, which is a function of assist torque, a damping value, and any other EPS signals summed at summation block 1410. A final motor command is generated by combining the assist command with the return command at adder 1412. As shown, the system described in FIG. 9 is applicable to a controlled velocity return function, which requires a steering wheel to return to a center position at a pre-defined velocity when the driver's hands are not present on the steering wheel. The EPS determines that a driver's hands are no longer present on the wheel, and generates a motor torque to assist the return of the wheel to a center position. The absence of a driver's hands on the wheel is detected slower than desired when using t-bar torque because of a time lag between the actual hands-off wheel event, and the decrease of the t-bar torque to a zero value. The t-bar torque is affected not only by driver torque but also handwheel inertia, damping, and other forces and assemblies in communication with the EPS. Following a hands off wheel event, driver torque typically decreases to a zero value more quickly than a t-bar torque. Thus, the driver torque can be used in one embodiment to responsively enable an assist torque. This allows a steering wheel to return to a center position after a minimal unassisted time interval.

Figure 10:
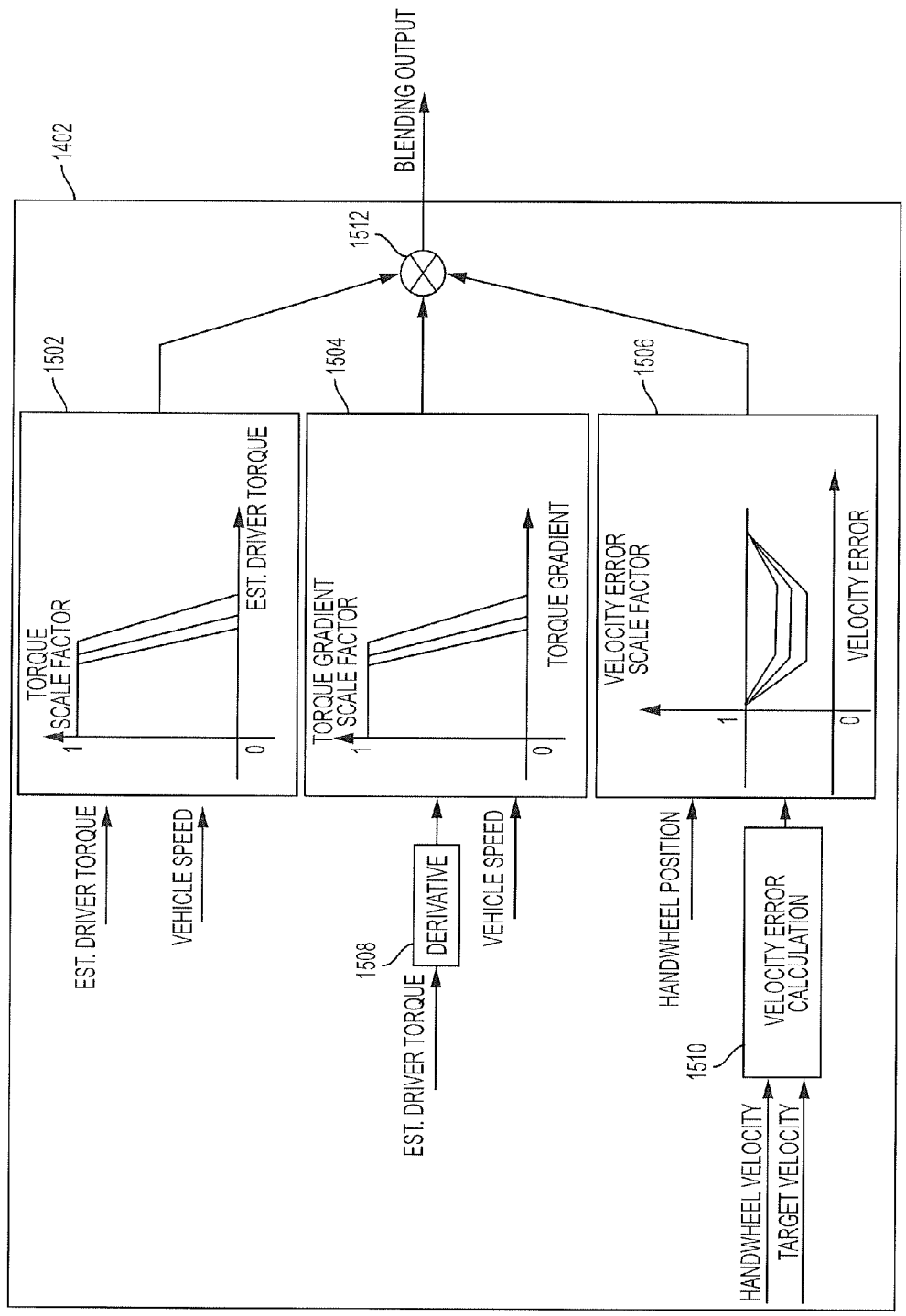
FIG. 10 illustrates a dataflow diagram of the blending module in accordance with one embodiment of the disclosure.

FIG. 10 illustrates the blending module 1402 in accordance some embodiments. The blending module 1402 may comprise a torque scale factor module 1502, a torque gradient scale module 1504 and a velocity error scale module 1506. The blending module 1402 further includes a derivative block 1508 and a desired velocity error calculation block 1510.

The torque scale factor module 1502 determines a torque scale factor as a function of the estimated driver torque and vehicle speed. In FIG. 10, driver torque or handwheel torque may be used in place of estimated driver torque. While estimated driver torque is shown in FIG. 10, it should be understood that measured handwheel torque may also be used as an alternative. The torque scale factor module 1502 can use a plurality of threshold values to determine a magnitude of the torque scale factor. For estimated driver torque values that are below a full return torque threshold in magnitude, the torque scale factor module 1502 may not reduce a magnitude of the torque scale factor, and for estimated driver torque values that exceed a zero return torque threshold, the torque scale factor module 1502 may reduce magnitude of the torque scale factor to a value of zero. For estimated driver torque values that fall between the full return torque threshold and the zero return torque threshold, the torque scale factor module 1502 may reduce the torque scale factor proportionally as the estimated driver torque increases in magnitude. The increase in estimated driver torque generally corresponds to increased driver control of the handwheel. Thus, the torque scale factor is reduced as driver control is increased, according to the requisite thresholds described above.

The torque gradient scale module 1504 computes a torque gradient scale factor based on a derivative of the estimated driver torque and a vehicle speed. The derivative of the estimated driver torque is calculated and output by derivative block 1508. The derivative value represents a torque gradient (e.g. rate of change of driver torque). The torque gradient scale module 1504 may selectively reduce the torque gradient scale factor based on the derivative of the estimated driver torque (torque gradient). In some embodiments, similar to the torque scale factor module 1502, the torque gradient scale module 1504 may set a plurality of thresholds to reduce the torque gradient scale factor as a function of increased torque gradient magnitude. A torque gradient magnitude exceeding set threshold values may be indicative of driver intervention with the handwheel. By reducing the torque gradient scale factor as the torque gradient increases, inappropriate application of the return torque can be avoided, increasing steering feel and responsiveness for the driver.

As an example, for torque gradient values that are lesser in magnitude than a full torque gradient threshold, the torque gradient scale module 1504 may not reduce a magnitude of the torque gradient scale factor, and for torque gradient values that exceed a zero torque gradient threshold, the torque gradient scale module 1504 may reduce magnitude of the torque gradient scale factor to a value of zero. For torque gradient values that fall between the full torque gradient threshold and the zero torque gradient threshold, the torque gradient scale module 1504 may reduce the torque gradient scale factor proportionally as the torque gradient increases in magnitude.

The velocity error scale module 1506 outputs a velocity error scale factor as a function of a velocity error and handwheel position (e.g. handwheel angle). In some embodiments, the velocity error is calculated by obtaining a difference of a magnitude of handwheel velocity and a magnitude of a target velocity. The velocity error scale module 1506 may selectively reduce the velocity error scale factor output by the velocity error scale module 1506 as a function of the velocity error and handwheel position.

In some embodiments, the velocity error scale module 1506 may set a plurality of thresholds to assist in the calculation of the velocity error scale factor. Based in part on these thresholds, the velocity error scale factor may be modified as a function of the velocity error and the handwheel position. These thresholds may be indicative of driver intervention with the handwheel at on-center areas. By reducing the velocity error scale factor as the velocity error and handwheel position are within set ranges, undesired return torque can be scaled down, resulting in less driver resistance and smoother steering effort for on-center steering maneuvers.

Specifically, in some embodiments, the velocity error scale module 1506 may set upper and lower velocity error thresholds, and upper and lower handwheel position thresholds. In operation, the velocity error scale module 1506 may not reduce a value of the velocity error scale factor for velocity error values that fall outside the upper and lower velocity thresholds and/or the upper and lower handwheel position thresholds (e.g. for velocity error values that are lesser in magnitude than the velocity error lower threshold or greater in magnitude than a velocity error upper threshold, or for handwheel position values that are lesser in magnitude than a handwheel position lower threshold or greater in magnitude than a handwheel position upper threshold). Accordingly, the magnitude of the velocity error scale factor may be unity due to the absence of reduction by the velocity error scale module 1506.

For velocity error values that fall within the velocity error upper and lower threshold values and/or the handwheel position upper and lower threshold values, the velocity error scale factor may be reduced. The plot shown within the velocity error scale module 1506 illustrates velocity error scale factor values as a function of velocity error and handwheel position. Although velocity error scale factor values are shown for three handwheel positions, the velocity error scale module 1506 is not limited to any number of handwheel positions or combinations of handwheel positions and velocity error values. Furthermore, the velocity error scale module 1506 may include a plurality of sub-thresholds that further refine or limit the magnitude of a reduction of the velocity error scale factor.

The torque scale factor, torque gradient scale factor, and the velocity error scale factor are sent to multiplier 1512 of blending module 1402. Multiplier 1512 creates a blending factor that is a function of the scale factors discussed above. As shown in FIG. 9, the blending factor is further combined with the return torque to generate a return command that may be modified by the torque gradient and/or the velocity error scale factor.

Figure 11:
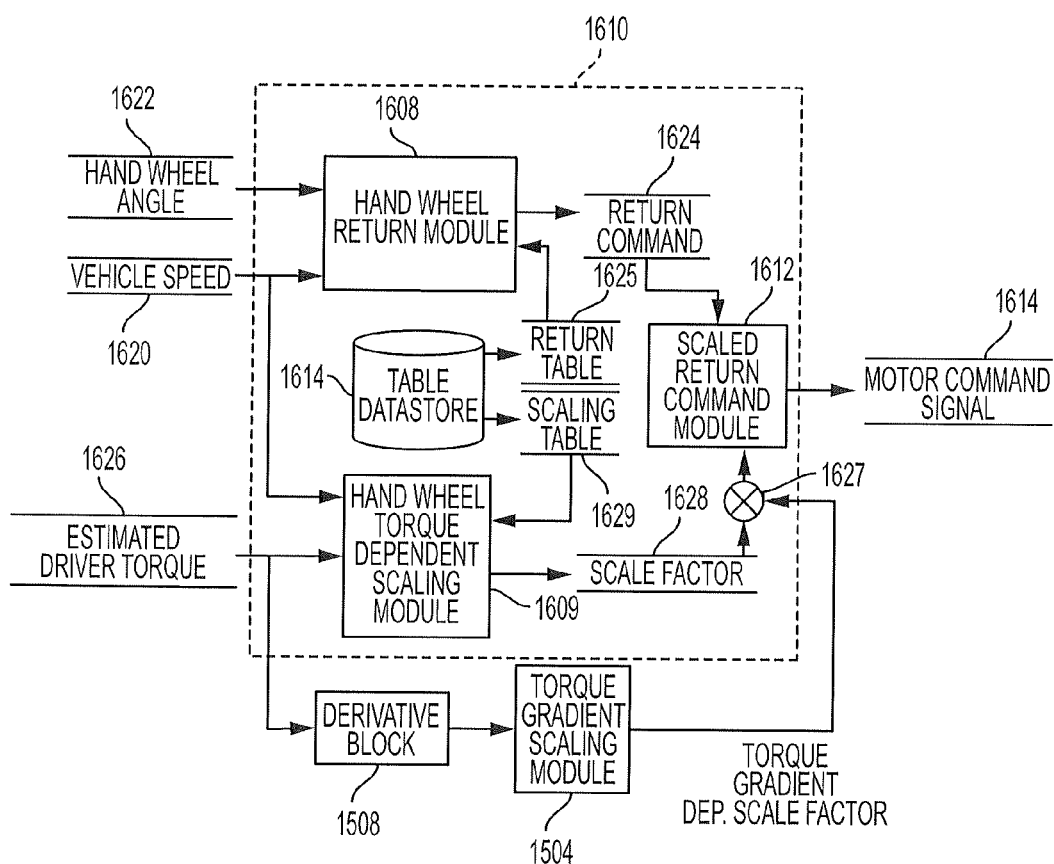
FIG. 11 illustrates the blending module applied to a feedforward return function in accordance with one embodiment of the disclosure.

As shown in FIG. 11, the torque gradient scale module 1504 and the derivative block 1508 (FIG. 10) may be implemented within a controller 1610 disclosed in U.S. 2010/0286869, which is herein incorporated by reference, to improve performance. A hand wheel torque dependent scaling module 1609 of the controller 1610 may receive an estimated driver torque signal 1626 instead of a torque signal from torsion bar sensor, and output a handwheel torque dependent scale factor to multiplier 1627. The hand wheel torque dependent scaling module 1609 outputs a hand wheel torque dependent scale factor 1628 that is blended at multiplier 1627 with the torque gradient dependent scale factor output by torque gradient scale module 1504. The multiplier 1627 outputs a blend value that improves system performance. Also, since an estimated driver torque is used, an additional torque sensor is not needed to acquire the torque data required by the controller 1610.

In particular, inputs to the controller 1610 of the control module 50 (FIG. 1) can be generated from the sensors 30-34 (FIG. 1) of the vehicle, can be modeled, and/or can be predefined. In this example, the controller 1610 includes a hand wheel return module 1608, a hand wheel torque dependent scaling module 1609, a scaled return command module 1612, and a table datastore 1614, as shown in FIG. 11.

The hand wheel return module 1608 receives as input vehicle speed 1620 and hand wheel angle 1622. The hand wheel angle 1622 may be, for example, an angular position of the hand wheel relative to the center position of the hand wheel. The hand wheel return module 1608 determines a return command 1624 based on the vehicle speed 1620 and the hand wheel angle 1622. In various embodiments, the hand wheel return module 1608 determines the return command 1624 using one or more hand wheel return lookup tables 1625. The lookup tables 1625 can be indexed by the vehicle speed 1620 and/or the hand wheel angle 1622. The lookup tables 1625 can be stored in and accessed from the table datastore 1614.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A power steering system comprising:
   a gain module that generates an estimated driver torque; and
   a blending module for determining a blend value, the blend value is based at least in part on a derivative of the estimated driver torque, the blend value is applied to a return torque of a handwheel.

2. The system of claim 1, the blending module comprises a torque scale factor module that determines a torque scale factor based on the estimated driver torque and a vehicle speed.

3. The system of claim 1, the blending module comprises a torque gradient scale module that computes a torque gradient scale factor, the torque gradient scale factor is computed based on the derivative of the estimated driver torque and a vehicle speed.

4. The system of claim 3, the torque gradient scale factor is calculated by comparing the derivative of the estimated driver torque with a plurality of threshold values.

5. The system of claim 4, the plurality of threshold values includes a full torque gradient threshold and a zero torque gradient threshold, the torque gradient scale factor is configured to reduce the return torque for derivative that exceeds the full torque gradient threshold, the derivative of the estimated driver torque indicates a rate of change of the estimated driver torque.

6. The system of claim 1, the blending module comprises a velocity error scale module that determines a velocity error scale factor, the velocity error scale factor is calculated based at least in part on a velocity error and a handwheel position, the velocity error is represented by a difference of a first magnitude of handwheel velocity and a second magnitude of target velocity.

7. The system of claim 6, the velocity error scale factor is calculated by velocity error thresholds and handwheel position thresholds, the velocity error scale factor is reduced for a velocity error that falls between the velocity error thresholds, the velocity error scale factor is further reduced as a function of handwheel position, wherein reducing the velocity error scale factor reduces a return torque.

8. The system of claim 1, the blend value is determined based on a multiplication of a torque scale factor, a torque gradient scale factor calculated from the derivative of the estimated driver torque, and a velocity error scale factor.

9. A method for controlling a power steering system comprising:
   generating an estimated driver torque; and
   determining a blend value, the blend value is based at least in part on a derivative of the estimated driver torque, the blend value is applied to a return torque of a handwheel.

10. The method of claim 9, further comprising determining a torque scale factor based on the estimated driver torque and a vehicle speed.

11. The method of claim 9, further comprising computing a torque gradient scale factor, the torque gradient scale factor is computed based on the derivative of the estimated driver torque and a vehicle speed.

12. The method of claim 11, the torque gradient scale factor is based on a comparison of the torque gradient scale factor with a plurality of threshold values.

13. The method of claim 12, the plurality of threshold values includes a full torque gradient threshold and a zero torque gradient threshold, the torque gradient scale factor is configured to reduce the return torque for derivative that exceeds the full torque gradient threshold, the derivative of the estimated driver torque indicates a rate of change of driver torque.

14. The method of claim 12, further comprising determining a velocity error scale factor, the velocity error scale factor is calculated based at least in part on a velocity error and a handwheel position, the velocity error is represented by a difference of a first magnitude of handwheel velocity and a second magnitude of target velocity.

15. The method of claim 14, the velocity error scale factor is calculated based on velocity error thresholds and handwheel position thresholds, the velocity error scale factor is reduced when the velocity error falls between the velocity error thresholds, the velocity error scale factor is further reduced as a function of handwheel position, wherein reducing the velocity error scale factor reduces a return torque.

\* \* \* \* \*